(12) United States Patent
Moyal et al.

(10) Patent No.: US 10,853,492 B2
(45) Date of Patent: Dec. 1, 2020

(54) SYSTEMS AND METHODS FOR PROTECTING A COMPUTING DEVICE AGAINST MALICIOUS CODE

(71) Applicant: Minerva Labs Ltd., Petach-Tikva (IL)

(72) Inventors: Omri Moyal, Nesher (IL); Erez Breiman, Tel-Aviv (IL); Eduard Bobritsky, Yahud-Monosson (IL)

(73) Assignee: Minerva Labs Ltd., Petach-Tikva (IL)

( * ) Notice: Subject to any disclaimer, the term of this patent is extended or adjusted under 35 U.S.C. 154(b) by 320 days.

(21) Appl. No.: 16/041,796

(22) Filed: Jul. 22, 2018

(65) Prior Publication Data
US 2020/0026856 A1 Jan. 23, 2020

(51) Int. Cl.
*G06F 21/56* (2013.01)
*G06F 21/53* (2013.01)

(52) U.S. Cl.
CPC ............ *G06F 21/566* (2013.01); *G06F 21/53* (2013.01); *G06F 21/563* (2013.01); *G06F 2221/033* (2013.01); *G06F 2221/2141* (2013.01); *G06F 2221/2149* (2013.01)

(58) Field of Classification Search
CPC ............ G06F 2221/2149; G06F 21/53; G06F 21/566; G06F 2221/2141; G06F 2221/563; G06F 2221/033
See application file for complete search history.

(56) References Cited

U.S. PATENT DOCUMENTS

| 8,195,953 B1* | 6/2012 | Yue ...................... G06F 21/566 713/187 |
| 2011/0258165 A1* | 10/2011 | Jung ..................... G06F 21/568 707/687 |
| 2020/0026855 A1 | 1/2020 | Moyal et al. |

FOREIGN PATENT DOCUMENTS

| KR | 20060133728 | 12/2006 |
| KR | 100996839 | 11/2010 |

* cited by examiner

*Primary Examiner* — Baotran N To (57) ABSTRACT

There is provided a computer implemented method of generating a vaccination profile of malicious code for vaccination against other instances of the malicious code, comprising: providing malicious code, analyzing the malicious code to identify at least one vaccination artifact system call indicative of an attempt to identify malicious code executing on a client computing device prior to another instance of the malicious code infecting the client computing device, generating according to the analysis of the malicious code, a vaccination profile including the at least one vaccination artifact system call, and providing the vaccination profile to a plurality of client computing devices for vaccination of the plurality of client computing devices uninfected by the malicious code, wherein an existing infection by the malicious code is emulated based on the vaccination profile for prevention of infection of the plurality of computing devices by another instance of the malicious code.

26 Claims, 3 Drawing Sheets

SYSTEMS AND METHODS FOR PROTECTING A COMPUTING DEVICE AGAINST MALICIOUS CODE

RELATED APPLICATION

This application is co-filed with U.S. patent application Ser. No. 16/041,795 and titled SYSTEMS AND METHODS FOR PROTECTING A COMPUTING DEVICE AGAINST MALICIOUS CODE, the contents of which are incorporated herein by reference in their entirety.

BACKGROUND

The present invention, in some embodiments thereof, relates to cybersecurity and, more specifically, but not exclusively, to systems and methods for protecting a computing device against malicious code.

Malicious code is designed to cause damage to a computer, server, and/or network computing device, for example, to disrupt operation of a computer, steal data, and/or ransom a computer for money. Malware is designed to spread from one computer to another, for example, by transmitting itself over a network, injecting itself into existing code, and/or via portable storage devices. Examples of malicious code include computer viruses, worms, Trojan horses, ransomware, spyware, adware, and scareware. Malware may be implemented, for example, as executable code, scripts, and/or injection.

Anti-malware applications are continuously being developed in an effort to protect computers against infection by malicious code.

SUMMARY

According to a first aspect, a computer implemented method of generating a vaccination profile of malicious code for vaccination against other instances of the malicious code, comprises: providing malicious code, analyzing the malicious code to identify at least one vaccination artifact system call indicative of an attempt to identify malicious code executing on a client computing device prior to another instance of the malicious code infecting the client computing device, generating according to the analysis of the malicious code, a vaccination profile including the at least one vaccination artifact system call, and providing the vaccination profile to a plurality of client computing devices for vaccination of the plurality of client computing devices uninfected by the malicious code, wherein an existing infection by the malicious code is emulated based on the vaccination profile for prevention of infection of the plurality of computing devices by another instance of the malicious code.

According to a second aspect, a system for generating a vaccination profile of malicious code for vaccination against other instances of the malicious code, comprises: a non-transitory memory having stored thereon a code for execution by at least one hardware processor, the code comprising: code for accessing malicious code, code for analyzing the malicious code to identify at least one vaccination artifact system call indicative of an attempt to identify malicious code executing on a client computing device prior to another instance of the malicious code infecting the client computing device, code for generating according to the analysis of the malicious code, a vaccination profile including the at least one vaccination artifact system call, and code for providing the vaccination profile to a plurality of client computing devices for vaccination of the plurality of client computing devices uninfected by the malicious code, wherein an existing infection by the malicious code is emulated based on the vaccination profile for prevention of infection of the plurality of client computing devices by another instance of the malicious code.

According to a third aspect, a computer program product for generating a vaccination profile of malicious code for vaccination against other instances of the malicious code, comprises: a non-transitory memory having stored thereon a code for execution by at least one hardware processor, the code comprising: instructions for accessing malicious code, instructions for analyzing the malicious code to identify at least one vaccination artifact system call indicative of an attempt to identify malicious code executing on a client computing device prior to another instance of the malicious code infecting the client computing device, instructions for generating according to the analysis of the malicious code, a vaccination profile including the at least one vaccination artifact system call, and instructions for providing the vaccination profile to a plurality of client computing devices for vaccination of the plurality of client computing devices uninfected by the malicious code, wherein an existing infection by the malicious code is emulated based on the vaccination profile for prevention of infection of the plurality of client computing devices by another instance of the malicious code.

At least some of the systems, methods, apparatus, and/or code instructions described here relate to the technical problem of protection against infection by malicious code.

At least some of the systems, methods, apparatus, and/or code instructions described herein improve the technology of cybersecurity, by improving the ability of a computing device (e.g., client terminal, server, networking device) to protect itself again infection by malicious code. In particular, improving the ability of the computing device to emulate an existing infection by malicious code, for preventing infection of the computing device by another instance of the malicious code.

At least some of the systems, methods, apparatus, and/or code instructions described herein are related to a vaccination profile that is used to emulate infection of the computing device to malicious code that is attempting to infect the computing device. The emulated infection prevents the malicious code from infecting the computing device.

At least some of the systems, methods, apparatus, and/or code instructions described herein provide technical improvements and/or technical advantages over other cybersecurity methods that protect against infection by malicious code. For example, the vaccination profile described herein prevents infection by the malicious code by emulating an already present infection of an instance of the malicious code to the malicious code attempting infection. The malicious code, which is programmed to avoid re-infection of the computing device, aborts the attempt to infect the computing device based on the emulated infection which is generated according to the vaccination profile. In another example, at least some of the systems, methods, apparatus, and/or code instructions described herein provide protection to a computing device prior to infection by the malicious code, in comparison to other methods that detect and attempt to remove an already present infection. In another example, the vaccination profile is used for vaccination against previously unknown malicious code. The setting of vaccination markers by the malicious code is analyzed and used to generate the vaccination profile, which does not necessarily requiring recognition of the actual malicious code itself. The vaccination profile is different than signature based method, for example, by including system calls that may appear to be otherwise benign on their own, but are in fact used by the malicious code to detect whether another instance of the malicious code is already installed on the computing device to determine whether to continue infection or abort the infection.

In at least some implementations of the systems, methods, apparatus, and/or code instructions described herein, the vaccination profile is created in a unique manner, by executing the malicious code within a safe environment (e.g., sandbox), monitoring systems calls made by the malicious code, and identifying potential vaccination artifact system calls from the monitored systems calls when the system calls are unknown. The system calls may be compared to whitelist of known benign calls and/or a blacklist of known malicious calls. Each unknown system call is then analyzed, by re-executing the malicious code in the safe environment (e.g., triggering a resetting of the emulated host). In response to the unknown potential vaccination artifact system call, the unknown potential vaccination artifact system call is intercepted and a false indication of execution of the unknown potential vaccination artifact system call is provided. The false indication is provided according to actual indication that would otherwise be provided when the unknown potential vaccination artifact system call is allowed to execute. When the malicious code aborts the process of infection of the emulated host computing device, the unknown potential vaccination artifact system call is designated as a vaccination artifact system call and stored in the vaccination profile.

In at least some implementations of the systems, methods, apparatus, and/or code instructions described herein, the vaccination profile is created in a unique manner, by executing the malicious code within a safe environment (e.g., sandbox), monitoring systems calls made by the malicious code, and identifying potential vaccination artifact system calls from the monitored systems calls. The potential vaccination artifacts system calls may be identified according to changes in instructions to access resources of the host computing device and/or similarities in instructions to access resources of the host computing device of the malicious code before and after a re-execution of the malicious code, for example, by resetting the host computing device. The vaccination artifacts system calls may be identified when the malicious code repeats a storage instruction in a volatile memory which was wiped out by the reset, and/or identified when the malicious code does not repeat a storage instruction in a data storage device that retains stored data after a reset.

At least some of the systems, methods, apparatus, and/or code instructions described herein do not simply relate to the generate idea of screening for malicious code, but provide a particular approach based on the vaccination profile, for preventing infection by malicious code by emulating an already present infection of another instance of the malicious code to the malicious code attempting infection. Moreover, at least some of the systems, methods, apparatus, and/or code instructions described herein do not simply relate to using a signature of a malicious code to screen for infection by the malicious code, but are based on a new data structure, the vaccination profile, for preventing infection by emulating an already present infection. The vaccination profile includes data to emulate an already present infection by an instance of the malicious code.

The vaccination profile is produced by a process that analyzes the infecting behavior of malicious code in attempting to identify whether another instance of the malicious code has already infected the computing device. The analysis of the infecting behavior of malicious code in attempting to identify whether another instance of the malicious code has already infected the computing device is distinguished, for example, from traditional "code-matching" malicious code scanning programs that are limited to recognizing the presence of previously-identified malicious code, typically by comparing the malicious code to a database of known malicious code, and/or based on signatures of known malicious code. Therefore, the creation of the vaccination profile to prevent infection by malicious code, as described herein, constitutes an improvement in computer functionality, in particular, an improvement to the technical field of cybersecurity.

Moreover, the vaccination profile described herein is different than other "behavior-based" approaches to scanning for malicious code. In contract to "behavior-based" approaches, which simply determine whether the malicious code performs malicious operations (i.e., dangerous and/or unwanted operations such as renaming or deleting files), the vaccination profile described herein is used to emulate infection of an already existing instance of malicious code for preventing another instance of the malicious code in infecting the computing device. The vaccination profile is created based on an analysis of the actions performed by malicious code to determine whether another instance of the malicious code has already infected the computing device. Such actions performed by the malicious code to determine whether another instance of the malicious code has already infected the computing device may not necessarily be malicious acts themselves, for example, the actual acts may be benign acts of no particular consequence when taken alone. Therefore, other signature and/or behavior based methods do not consider such actions to determine whether another instance of the malicious code has already infected the computing device. Moreover, use of the vaccination profile, which may include acts performed by the malicious code that are benign alone, may prevent infection and/or detect malicious code before any malicious activity has taken place.

At least some of the systems, methods, apparatus, and/or code instructions described herein address the technical problem of malicious code that evolves to evade signature-based detection processes. New versions of the malicious code, which have different signatures, cannot be detected by earlier versions of the signature-based detection processes. Therefore, great effort is expended to try to update the signature-based detection processes to keep up with the evolving malicious code. At least some of the systems, methods, apparatus, and/or code instructions described herein which create the vaccination profile described herein, are able to prevent infection by the new versions of the malicious code that are not detected by signature-based detection processes, by emulating infection by an earlier version of the malicious code. The new version of the malicious code attempts to detect the earlier version of the malicious code to prevent another infection of the same computing device by malicious code of the same malware family. The malicious code may avoids re-infection of the computing device (i.e., making sure the computing device is only infected one time by the malicious code of the same family), for example, since there is no advantage for the malware in the re-infection, but in fact, a re-infection might reduce performance of the malicious code, for example, by reducing stability of the computing device due to multiple infections such as when the malicious code nests deep inside the operating system.

The systems, methods, apparatus, and/or code instructions described herein employ a new data structure, the vaccination profile described herein, that enables a computer security system to do things it could not do before. The vaccination profile approach ensures that malicious threats are identified before infecting a computing device, by emulating an already existing infection of the malicious code to another instance of the malicious code attempting infection of the computing device. The emulation triggers the malicious code attempting infection to abort and/or avoid a re-infection of the computing device.

At least some of the systems, methods, apparatus, and/or code instructions described herein prevent infection by malicious code that would otherwise not be prevented and/or detected by other methods. For example, customized code injected into a system to create a backdoor entry for a hacker. Such malicious code may not necessarily be malicious in and of itself, by allowing other humans and/or other code to do the malicious activity rather than by doing the malicious activity itself, and therefore would not be identified by other methods that are based on detecting malicious behavior and/or based on signatures of known malicious code.

In a further implementation form of the first, second and third aspects, the at least one vaccination artifact system call includes an indication of respective infection markers stored by the malicious code in a data storage medium for indicating an existing infection to the another instance of the malicious code attempting infection, wherein the infection markers are stored in the vaccination profile, wherein the existing infection of the plurality of client computing devices is emulated by providing a false indication of the presence of the infection marker in the data storage medium in response to the at least one vaccination artifact system call issued by the another instance of the malicious code attempting infection.

In a further implementation form of the first, second and third aspects, the analyzing the malicious code comprises: triggering an initial execution of the malicious code in a safe analysis environment that emulates a host computing device, logging monitored system calls of the executing malicious code, wherein the monitored system calls denote a plurality of potential vaccination artifact system calls representing candidates for indicating to another instance of the malicious code attempting infection of the client computing device that the client computing device is already infected with the malicious code, and analyzing the plurality of potential vaccination artifact system calls to select the at least one vaccination artifact system call according to a set of rules.

In a further implementation form of the first, second and third aspects, the analyzing the plurality of potential vaccination artifact system calls comprises: triggering re-execution of the malicious code within the safe analysis environment, detecting an attempt by the malicious code to execute at least one of the plurality of potential vaccination artifact system calls, intercepting the execution of at least one of the plurality of potential vaccination artifact system call, providing the malicious code with a false indication of execution of the at least one of the plurality of potential vaccination artifact system calls according to an actual indication of execution of the at least one of the plurality of vaccination artifact system call provided to the malicious code during the initial execution of the malicious code, and selecting the at least one vaccination artifact system call when the malicious code aborts a process of infection in response to the provided false indication of the at least one of the plurality of potential vaccination artifact system calls.

In a further implementation form of the first, second and third aspects, the at least one vaccination artifact system call is selected according to a first dataset storing records of system calls labeled as malicious.

In a further implementation form of the first, second and third aspects, the first dataset is stored in the vaccination profile as a blacklist of known malicious vaccination artifact system calls.

In a further implementation form of the first, second and third aspects, a certain potential vaccination artifact system call of the plurality of potential vaccination artifact system calls is labeled as unknown when the certain potential vaccination artifact is not matched to a record stored in the first dataset and is not matched to a record stored in a second dataset storing records of systems calls labeled as benign.

In a further implementation form of the first, second and third aspects, the second dataset is stored in the vaccination profile as a whitelist of known benign vaccination artifact system calls.

In a further implementation form of the first, second, and third aspects, the method further comprises and/or the system further comprises code instructions for and/or the computer program product further comprises additional instructions for re-analyzing the malicious code by re-executing the malicious code, re-logging monitored system calls of the re-executed malicious code, comparing the initial execution of the malicious code to the re-execution of the malicious code to identify changes in instructions to access resources of the host computing device, and storing the potential vaccination artifact system call labeled as unknown in the first dataset as a malignant record or in the second dataset as a benign record according to the identified changes in instructions to access resources of the host computing device.

In a further implementation form of the first, second and third aspects, the identified changes in instructions to access resources of the host computing device are selected from the group consisting of: execution time changes, installation errors, network activity, process creation, thread creation, file creation, and registry creation.

In a further implementation form of the first, second, and third aspects, the method further comprises and/or the system further comprises code instructions for and/or the computer program product further comprises additional instructions for computing according to the identified changes in instructions to access resources of the host computing device, a score indicative of at least one of: likelihood of the change in instructions to access resources of the host computing device being indicative of malicious actions, and or likelihood of the change in instructions to access resources of the host computing device being indicative of benign actions, wherein the potential vaccination artifact system call is stored in the first dataset or second dataset according to the value of the score.

In a further implementation form of the first, second, and third aspects, the method further comprises and/or the system further comprises code instructions for and/or the computer program product further comprises additional instructions for re-executing the malicious code by emulating a resetting of a computing device hosting the malicious code, and wherein the identified change in instructions to access resources of the host computing device include re-storing an infection marker in a volatile storage medium.

In a further implementation form of the first, second and third aspects, the identified change in instructions to access resources of the host computing device include detecting during the re-execution a lack of an attempt at re-storing an infection marker in a non-volatile storage medium, where the infection marker is stored in the non-volatile storage medium during the initial execution of the malicious code.

In a further implementation form of the first, second and third aspects, the another instance of the malicious code comprises another version of the malicious code.

In a further implementation form of the first, second and third aspects, the vaccination profile stores a set of rules for matching patterns of vaccination artifact system calls.

In a further implementation form of the first, second, and third aspects, the method further comprises and/or the system further comprises code instructions for and/or the computer program product further comprises additional instructions for receiving from a second computing device, via an application programming interface (API), instructions selected from the group consisting of: a request to add a new vaccination artifact system call to the vaccination profile, a request to delete an existing vaccination artifact system call from the vaccination profile, and a request to retrieve a certain vaccination artifact system call stored in the vaccination profile.

In a further implementation form of the first, second and third aspects, the analysis comprises: triggering execution of the malicious code within a sandbox, logging monitored system calls of the executing malicious code, analyzing the monitored system calls to identify at least one vaccination artifact system call according to a property of a certain monitored system call for emulating an existing infection of another instance of the malicious code by providing the malicious code with false data in response to the certain system call.

In a further implementation form of the first, second and third aspects, another monitored system call is not identified as a vaccination artifact system call when the another monitored system call excludes the property for emulating the existing infection of another instance of the malicious code when the another monitored system call is unable to provide the malicious code with false data in response to the certain system call.

In a further implementation form of the first, second and third aspects, a first signature of the malicious code is different from a second signature of the another instance of the malicious code, such that an anti-malware program trained to detect the malicious code according to the first signature is unable to detect the another instance of the malicious code according to the first signature.

In a further implementation form of the first, second and third aspects, the another instance of the malicious code aborts a process of infection of one of the plurality of computing devices when receiving false data emulating at least one infection marker stored in a storage medium, in response to attempted execution of the at least one of the at least one vaccination artifacts system call executed by the malicious code.

In a further implementation form of the first, second and third aspects, the at least one vaccination artifact system call comprises operating system queries for detecting at least one infection marker stored in a storage medium, wherein the at least one infection marker indicates to another instance of malicious code attempting infection that the client computing device is already infected by the malicious code.

In a further implementation form of the first, second and third aspects, the operating system queries for detecting infection markers are selected from the group consisting of: detecting a predefined mutex stored in memory, detecting a predefined file stored in a data storage device, detecting a predefined key stored in a system registry, and combinations of the aforementioned.

In a further implementation form of the first, second and third aspects, the at least one vaccination artifact system call comprises operating system instructions for storing at least one infection marker in a storage medium, wherein the at least one infection marker indicates to another instance of the malicious code attempting infection that the client computing device is already infected by the malicious code.

In a further implementation form of the first, second and third aspects, the operating system queries for storing infection markers are selected from the group comprising: storing a predefined mutex in memory, storing a predefined file in a data storage device, storing a predefined key in a system registry, and combinations of the aforementioned.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to cybersecurity and, more specifically, but not exclusively, to systems and methods for protecting a computing device against infection by malicious code.

As used herein, the term vaccination refers to the process of protecting of a client computing device by emulating an existing infection of malware in response to a system call issued by another instance of the malware. The emulation of existing infection is performed based on the vaccination profile by providing a false response to the system call. In response to receiving the false indication, the malware does not infect the client computing device (e.g., aborting the infection process).

As used herein, the term vaccination artifact system call refers to operating system calls (which may sometimes be referred to as operating system queries) to determine whether the client computing device is presently infected or not, optionally by detecting the presence of an infection marker in a data storage device. The infection marker may be a predefined value and/or data structure defined by the malicious code. The vaccination artifact system call may include operating system instructions (also referred to herein as system calls) for storing the infection marker in the data storage device. The presence of the stored infection marker is intended to be queried by another instance of the malicious code attempting infection. When the infection marker is detected, the another instance of the malicious code aborts infection of the client computing device, as the client computing device is already infected.

As used herein, the term system call may sometimes be interchanged with the term operating system query (e.g., when checking whether an infection marker is stored in a data storage device) and/or with the term operating system instructions (e.g., when generating instructions to the operating system to store the infection marker in the data storage device).

An aspect of some embodiments of the present invention relates to systems, methods, an apparatus, and/or code instructions (i.e., stored in a data storage device, executable by one or more hardware processors) for generating a vaccination profile of malicious code for vaccination against other instances of the malicious code. The other instances may be different versions of the malicious code, designed to evade anti-malware programs, for example, based on signature recognition of the malicious code. The vaccination profile is created based on an analysis of the malicious code. The malicious code is analyzed to identify vaccination artifact system call(s) that are indicative of an attempt to identify malicious code executing on a client computing device prior to another instance of the malicious code infecting the client computing device. Vaccination artifact system call(s) may include operating system queries to detect the presence of a predefined infection marker stored at a predefined location in a data storage device. The vaccination profile is generated according to the analysis of the malicious code, and includes the identified vaccination artifact system calls and optionally associated infection marker(s). The vaccination profile is provided to multiple computing devices for vaccination of each respective computing device that is uninfected by the malicious code. The vaccination against infection by the malicious code may be performed by emulating an existing infection of respective computing device by the malicious code based on the vaccination profile. Another instance of the malicious code, when provided with the emulated existing infection of the computing device by the malicious code, is prevented from infecting the computing device.

Optionally, the vaccination artifact system call(s) of the vaccination profile include respective indications of infection markers. The infection markers are stored by the malicious code (i.e., during infection of the host computing device) in a data storage medium for indicating an existing infection to another instance of the malicious code attempting infection. The existing infection of the respective client computing devices is emulated by providing a false indication of the presence of the infection marker in the data storage medium in response to the vaccination artifact system call(s) issued by the another instance of the malicious code attempting infection.

Optionally, the vaccination artifacts system calls are automatically identified. The malicious code may be placed in a safe analysis environment that emulates a host computing device to the malicious code, for example, a sandbox, and executed. System calls made by the malicious code are monitored. The system calls represent potential vaccination artifact system calls. Each potential vaccination artifact system call represents a candidate for indicating to another instance of the malicious code attempting infection of the certain computing device that the certain computing device is already infected with the malicious code. The potential vaccination artifact system calls are analyzed to select the vaccination artifact system call(s), optionally according to a set of rules and/or according to other methods described herein.

Optionally, the potential vaccination artifact system calls are analyzed by re-executing the malicious code within the safe analysis environment (e.g., sandbox). Optionally, the potential vaccination artifact system calls that are re-analyzed include potential vaccination artifact system calls labeled as unknown when no association with known malicious actions (e.g., instructions to access resources of the host computing device) or benign actions is identified. The unknown potential vaccination artifact system calls are analyzed to determine whether they are associated with malicious actions or benign actions. An attempt by the malicious code to execute the selected (i.e., newly identified) vaccination artifact system call is detected, and the malicious code is provided with a false indication (i.e., emulated response) in response to the selected vaccination artifact system call. For example, in response to a query to determine whether a predefined infection marker is located at a predefined location in memory, the false indication is indicative of the presence of the predefined infection marker, when in fact no such predefined infection marker is stored in memory. The selected vaccination artifact system call is validated and added to the vaccination profile when the malicious code terminates the process of infection in response to the provided false indication. Alternatively or additionally, the monitored system calls of the re-executed malicious code are logged and compared to the previous execution of the malicious code to identify changes in instructions to access resources of the host computing device. The changes in instructions to access resources of the host computing device are analyzed to determine whether the changes in instructions represent malicious activity by the malicious code upon successful infection of the host computing device, and/or whether for example, the changes in instructions represent benign activity. Each potential vaccination artifact system calls is labeled as malicious or benign according to the identified and/or analyzed changes in instructions to access resources of the host computing device.

At least some of the systems, methods, apparatus, and/or code instructions described here relate to the technical problem of protection against infection by malicious code.

At least some of the systems, methods, apparatus, and/or code instructions described herein improve the technology of cybersecurity, by improving the ability of a computing device (e.g., client terminal, server, networking device) to protect itself again infection by malicious code. In particular, improving the ability of the computing device to emulate an existing infection by malicious code, for preventing infection of the computing device by another instance of the malicious code.

At least some of the systems, methods, apparatus, and/or code instructions described herein are related to a vaccination profile that is used to emulate infection of the computing device to malicious code that is attempting to infect the computing device. The emulated infection prevents the malicious code from infecting the computing device.

At least some of the systems, methods, apparatus, and/or code instructions described herein provide technical improvements and/or technical advantages over other cybersecurity methods that protect against infection by malicious code. For example, the vaccination profile described herein prevents infection by the malicious code by emulating an already present infection of an instance of the malicious code to the malicious code attempting infection. The malicious code, which is programmed to avoid re-infection of the computing device, aborts the attempt to infect the computing device based on the emulated infection which is generated according to the vaccination profile. In another example, at least some of the systems, methods, apparatus, and/or code instructions described herein provide protection to a computing device prior to infection by the malicious code, in comparison to other methods that detect and attempt to remove an already present infection. In another example, the vaccination profile is used for vaccination against previously unknown malicious code. The setting of vaccination markers by the malicious code is analyzed and used to generate the vaccination profile, which does not necessarily requiring recognition of the actual malicious code itself. The vaccination profile is different than signature based method, for example, by including system calls that may appear to be otherwise benign on their own, but are in fact used by the malicious code to detect whether another instance of the malicious code is already installed on the computing device to determine whether to continue infection or abort the infection.

In at least some implementations of the systems, methods, apparatus, and/or code instructions described herein, the vaccination profile is created in a unique manner, by executing the malicious code within a safe environment (e.g., sandbox), monitoring systems calls made by the malicious code, and identifying potential vaccination artifact system calls from the monitored systems calls when the system calls are unknown. The system calls may be compared to whitelist of known benign calls and/or a blacklist of known malicious calls. Each unknown system call is then analyzed, by re-executing the malicious code in the safe environment (e.g., triggering a resetting of the emulated host). In response to the unknown potential vaccination artifact system call, the unknown potential vaccination artifact system call is intercepted and a false indication of execution of the unknown potential vaccination artifact system call is provided. The false indication is provided according to actual indication that would otherwise be provided when the unknown potential vaccination artifact system call is allowed to execute. When the malicious code aborts the process of infection of the emulated host computing device, the unknown potential vaccination artifact system call is designated as a vaccination artifact system call and stored in the vaccination profile.

In at least some implementations of the systems, methods, apparatus, and/or code instructions described herein, the vaccination profile is created in a unique manner, by executing the malicious code within a safe environment (e.g., sandbox), monitoring systems calls made by the malicious code, and identifying potential vaccination artifact system calls from the monitored systems calls. The potential vaccination artifacts system calls may be identified according to changes in instructions to access resources of the host computing device and/or similarities in instructions to access resources of the host computing device of the malicious code before and after a re-execution of the malicious code, for example, by resetting the host computing device. The vaccination artifacts system calls may be identified when the malicious code repeats a storage instruction in a volatile memory which was wiped out by the reset, and/or identified when the malicious code does not repeat a storage instruction in a data storage device that retains stored data after a reset.

At least some of the systems, methods, apparatus, and/or code instructions described herein do not simply relate to the generate idea of screening for malicious code, but provide a particular approach based on the vaccination profile, for preventing infection by malicious code by emulating an already present infection of another instance of the malicious code to the malicious code attempting infection. Moreover, at least some of the systems, methods, apparatus, and/or code instructions described herein do not simply relate to using a signature of a malicious code to screen for infection by the malicious code, but are based on a new data structure, the vaccination profile, for preventing infection by emulating an already present infection. The vaccination profile includes data to emulate an already present infection by an instance of the malicious code.

The vaccination profile is produced by a process that analyzes the infecting behavior of malicious code in attempting to identify whether another instance of the malicious code has already infected the computing device. The analysis of the infecting behavior of malicious code in attempting to identify whether another instance of the malicious code has already infected the computing device is distinguished, for example, from traditional "code-matching" malicious code scanning programs that are limited to recognizing the presence of previously-identified malicious code, typically by comparing the malicious code to a database of known malicious code, and/or based on signatures of known malicious code. Therefore, the creation of the vaccination profile to prevent infection by malicious code, as described herein, constitutes an improvement in computer functionality, in particular, an improvement to the technical field of cybersecurity.

Moreover, the vaccination profile described herein is different than other "behavior-based" approaches to scanning for malicious code. In contract to "behavior-based" approaches, which simply determine whether the malicious code performs malicious operations (i.e., dangerous and/or unwanted operations such as renaming or deleting files), the vaccination profile described herein is used to emulate infection of an already existing instance of malicious code for preventing another instance of the malicious code in infecting the computing device. The vaccination profile is created based on an analysis of the actions performed by malicious code to determine whether another instance of the malicious code has already infected the computing device. Such actions performed by the malicious code to determine whether another instance of the malicious code has already infected the computing device may not necessarily be malicious acts themselves, for example, the actual acts may be benign acts of no particular consequence when taken alone. Therefore, other signature and/or behavior based methods do not consider such actions to determine whether another instance of the malicious code has already infected the computing device. Moreover, use of the vaccination profile, which may include acts performed by the malicious code that are benign alone, may prevent infection and/or detect malicious code before any malicious activity has taken place.

At least some of the systems, methods, apparatus, and/or code instructions described herein address the technical problem of malicious code that evolves to evade signature-based detection processes. New versions of the malicious code, which have different signatures, cannot be detected by earlier versions of the signature-based detection processes. Therefore, great effort is expended to try to update the signature-based detection processes to keep up with the evolving malicious code. At least some of the systems, methods, apparatus, and/or code instructions described herein which create the vaccination profile described herein, are able to prevent infection by the new versions of the malicious code that are not detected by signature-based detection processes, by emulating infection by an earlier version of the malicious code. The new version of the malicious code attempts to detect the earlier version of the malicious code to prevent another infection of the same computing device by malicious code of the same malware family. The malicious code may avoids re-infection of the computing device (i.e., making sure the computing device is only infected one time by the malicious code of the same family), for example, since there is no advantage for the malware in the re-infection, but in fact, a re-infection might reduce performance of the malicious code, for example, by reducing stability of the computing device due to multiple infections such as when the malicious code nests deep inside the operating system.

The systems, methods, apparatus, and/or code instructions described herein employ a new data structure, the vaccination profile described herein, that enables a computer security system to do things it could not do before. The vaccination profile approach ensures that malicious threats are identified before infecting a computing device, by emulating an already existing infection of the malicious code to another instance of the malicious code attempting infection of the computing device. The emulation triggers the malicious code attempting infection to abort and/or avoid a re-infection of the computing device.

At least some of the systems, methods, apparatus, and/or code instructions described herein prevent infection by malicious code that would otherwise not be prevented and/or detected by other methods. For example, customized code injected into a system to create a backdoor entry for a hacker. Such malicious code may not necessarily be malicious in and of itself, by allowing other humans and/or other code to do the malicious activity rather than by doing the malicious activity itself, and therefore would not be identified by other methods that are based on detecting malicious behavior and/or based on signatures of known malicious code.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term client computing device may refer to client computers and/or servers. The client computing devices may be vaccinated by the vaccination profile described herein, for infection by malicious code.

Figure 1:
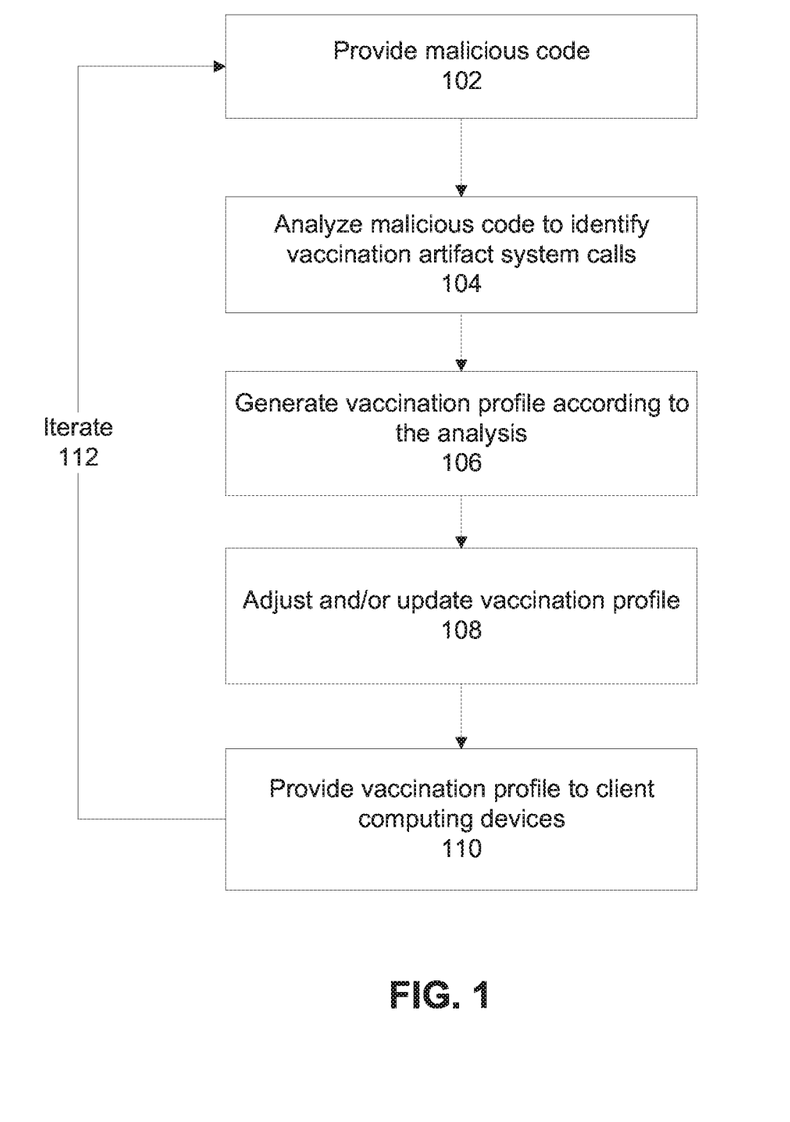
FIG. 1 is a flowchart of a process for generating a vaccination profile of malicious code for vaccination of a client computing device against infection by malicious code, in accordance with some embodiments of the present invention.
Figure 2:
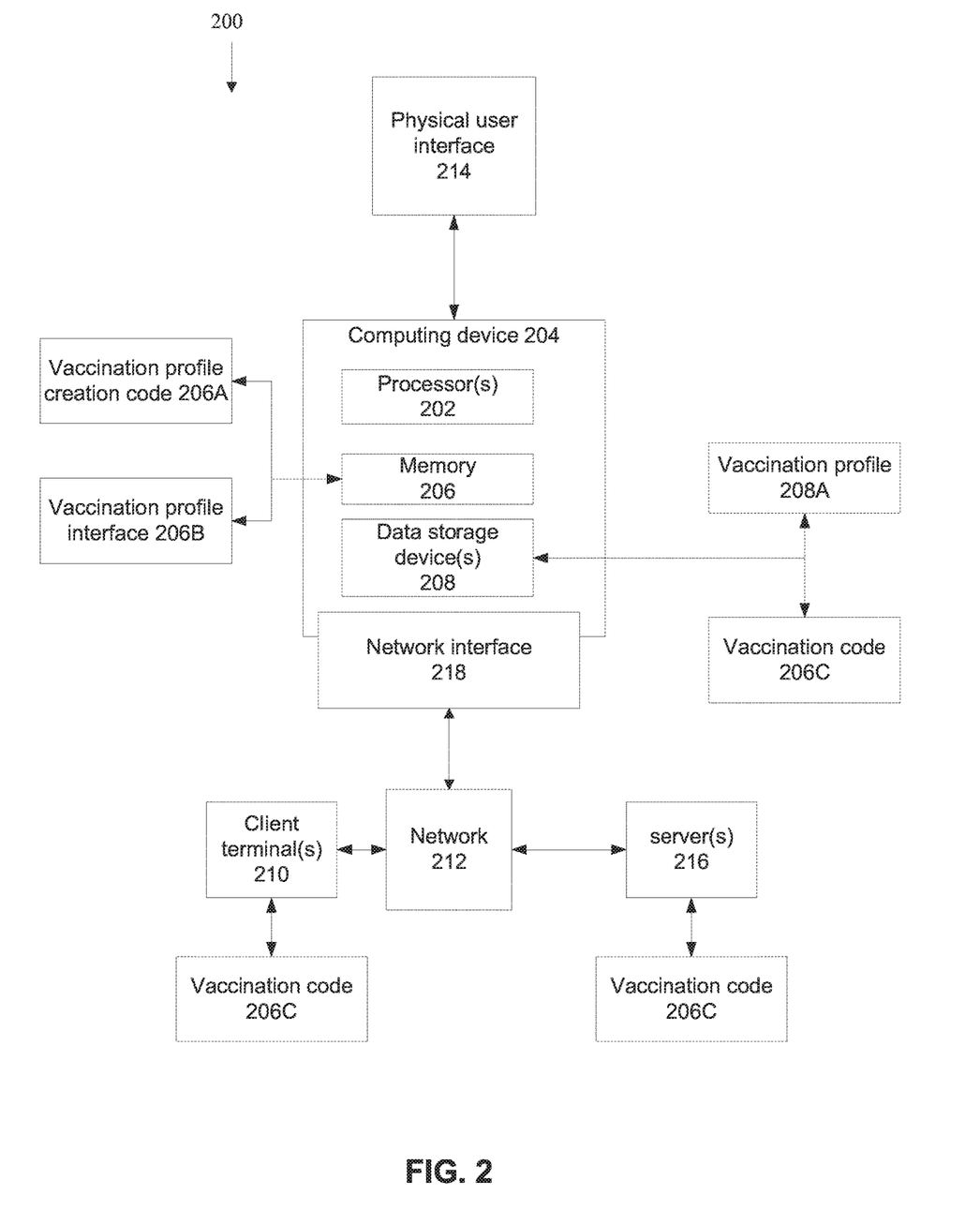
FIG. 2 is a block diagram of components of a system for generating a vaccination profile for vaccination of a client computing device against infection by malicious code, in accordance with some embodiments of the present invention.

Reference is now made to FIG. 1, which is a flowchart of a process for generating a vaccination profile for vaccination of a client computing device against infection by malicious code, in accordance with some embodiments of the present invention. Reference is also made to FIG. 2, which is a block diagram of components of a system 200 for generating a vaccination profile for vaccination of a client computing device against infection by malicious code, in accordance with some embodiments of the present invention. System 200 may implement the acts of the methods described with reference to FIG. 1, by processor(s) 202 of a computing device 204 executing code instructions (e.g., vaccination profile creation code 206A) stored in a memory 206 (also referred to as a program store).

Computing device 204 may be implemented as, for example one or more and/or combination of: a group of connected devices, a client terminal, a server, a virtual server, a computing cloud, a virtual machine, a desktop computer, a thin client, and/or a mobile device (e.g., a Smartphone, a Tablet computer, a laptop computer, a wearable computer, glasses computer, and a watch computer).

Multiple architectures of system 200 based on computing device 204 may be implemented. For example:

Computing device 204 may be implemented as one or more servers (e.g., network server, web server, a computing cloud, a virtual server) that locally generates the vaccination profile by executing locally stored vaccination profile creation code 206A. Vaccination profile 208A, which may be stored in a data storage device 208, is provided to client terminals(s) 210 and/or server(s) 216 over a network 212, for example, transmitted over network 212, and/or accessed by a software interface, for example, an application programming interface (API) (e.g., vaccination profile interface 206B) and/or software development kit (SDK). Each client terminal(s) 210 and/or server(s) 216 may store a respective copy of vaccination code 206C. Vaccination code 206C may be provided to client terminal(s) 210 and/or server(s) 216 by computing device 204 and/or other server over network 212. Client terminal(s) 210 and/or server(s) 216 execute vaccination code 206C according to the vaccination profile 208A for vaccination against malicious code, for example, as described with reference to co-filed Ser. No. 16/041,795.

Computing device 204 may be implemented as a stand-alone device (e.g., kiosk, client terminal, smartphone, server) that include locally stored vaccination profile creation code instructions 206A that implement one or more of the acts described with reference to FIG. 1 and executes vaccination code 206C (which may be locally stored in data storage device 208 and/or in memory 206). In such an implementation, the vaccination profile 208A is automatically generated by computing device 204, by executing vaccination profile creation code 206A. Computing device 204 vaccinates itself based on the vaccination profile 208A, by executing vaccination code 206C.

Computing device 204 may be implemented as one or more servers (e.g., network server, web server, a computing cloud, a virtual server) that provides vaccination services to client terminal(s) 210 and/or server(s) 216 over network 212. Computing device 204 includes locally stored vaccination profile creation code instructions 206A that implement one or more of the acts described with reference to FIG. 1 and optionally vaccination code 206C. In such an implementation, client terminal(s) 210 and/or server(s) 216 communicate with computing device 204 over network 212 for immunization thereof against malicious code. Communication may be performed, for example, via a software interface such as API and/or SDK (e.g., vaccination profile interface 206B). Code may be locally installed on each client terminal(s) 210 and/or server(s) 216 for communication with computing device 204, for example, for transmitting monitoring data for analysis by computing device 204, and receiving instructions from computing device 204 when an attempted infection by the malicious code is detected. Computing device 204 may transmit instructions for emulation of an existing infection (i.e., vaccination) by client terminal(s) 210 and/or server(s) 216 according to the vaccination profile 208A.

Hardware processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 202 may include a single processor, or multiple processors (homogenous or heterogeneous) arranged for parallel processing, as clusters and/or as one or more multi core processing devices.

Memory 206 stores code instructions executable by hardware processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 206 stores vaccination profile creation code 206A that implements one or more features and/or acts of the method described with reference to FIG. 1 when executed by hardware processor(s) 202 and/or stores vaccination code 206C and/or stores vaccination profile interface 206B and/or stores vaccination profile 208A.

Computing device 204 may include data storage device(s) 208 for storing data, for example, vaccination profile 208A, and/or vaccination code 206C (e.g., for providing to client terminal(s) 210 and/or server(s) 216) and/or vaccination profile interface 206B (e.g., for local use by computing device 204 and/or for providing to client terminal(s) 210 and/or server(s) 216). Data storage device(s) 208 may be implemented as, for example, a memory, a local hard-drive, virtual storage, a removable storage unit, an optical disk, a storage device, and/or as a remote server and/or computing cloud (e.g., accessed using a network connection).

Network 212 may be implemented as, for example, the internet, a local area network, a virtual network, a wireless network, a cellular network, a local bus, a point to point link (e.g., wired), and/or combinations of the aforementioned.

Computing device 204 may include a network interface 218 for connecting to network 212, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 204 and/or client terminal(s) 210 and/or server(s) 216 include and/or are in communication with one or more physical user interfaces 214 that include a mechanism for a user to interact with the vaccination profile and/or vaccination process, and/or view the vaccination profile and/or view the vaccination process. Exemplary physical user interfaces 214 include, for example, one or more of, a touchscreen, a display, gesture activation devices, a keyboard, a mouse, and voice activated software using speakers and microphone.

Client terminal(s) 210 and/or server(s) 216 may be implemented as, for example, as a desktop computer, a server, a virtual server, a network server, a web server, a virtual machine, a thin client, and a mobile device. Client terminal(s) 210 and/or server(s) 216 are sometimes referred to herein as client computing devices, which are being protected from infection (i.e., vaccinated) according to vaccination profile 208A.

Referring now back to FIG. 1, at 102, malicious code is provided for analysis. The malicious code may be provided to the computing device, for example, from the client terminal(s) and/or server(s) optionally via he vaccination profile interface, automatically identified by computing device, and/or manually provided by a user (e.g., manually identified, loaded from a secure portable storage device, downloaded from a remote data storage site).

At 104, the malicious code is analyzed to identify one or more vaccination artifact system calls. The vaccination artifact system calls are indicative of an attempt to identify malicious code executing on a client computing device (e.g., client terminal, server) prior to another instance of the malicious code infecting the client computing device. The another instance of the malicious code first attempts to determine whether the client computing device is already infected with the malicious code. The another instance of the malicious code only attempts to infect the client computing device when the client computing device is not already infected by the malicious code. When the another instance of the malicious detects that the client computing device is already infected by the malicious code, the another instance of the malicious code does not attempt infection of the client computing device (e.g., aborts the infection process).

Optionally, the vaccination artifact system call(s) include operating system queries for detecting infection marker(s) stored in a storage medium. The infection marker(s) are indicative that the client computing device is already infected by the malicious code. The infection marker(s) are used by the another instance of the malicious code attempting infection to determine that the client computing device is already infected by the malicious code, and trigger the another instance of the malicious code to abort the process of infecting the client computing device. Exemplary operating system queries for detecting infection markers include: detecting a predefined mutex stored in memory, detecting a predefined file stored in a data storage device, detecting a certain key stored in a system registry, and combinations of the aforementioned Alternatively or additionally, the vaccination artifact system call(s) include operating system instructions for storing infection marker(s) in a storage medium (e.g., volatile and/or non-volatile). Exemplary operating system queries for storing infection markers include: storing a certain mutex in memory, storing a predefined file in a data storage device, storing a certain key in a system registry, and combinations of the aforementioned.

The operating system instructions for storing infection marker(s) in the storage medium may be issued by the malicious code during the initial infection of the client computing device. The operating system instructions for detecting infection marker(s) stored in the storage medium may be issued by the malicious code during the initial infection of the client computing device, prior to issuing instructions for storing the infection marker. When the malicious code does not detect the presence of the infection marker stored in the storage medium, the malicious code issues instructions for storing the infection marker. Immunization against infection may be performed by providing a false indication to the malicious code that the infection marker is already stored on the storage device, in response to the query to detect the presence of the infection marker and/or in response to instructions to store the infection marker. Alternatively or additionally, immunization against infection may be performed by providing a false indication to the malicious code that the infection marker has been successfully stored on the storage medium (when in fact the infection marker has not been stored, but the storage instructions have been intercepted) in response to instructions to store the infection marker.

Alternatively or additionally, the malicious code is manually analyzed to identify one or more vaccination artifact system calls. The manual analysis may be performed by a user, for example, a malware analyzer. The manual analysis may include static and/or dynamic analysis. The manual analysis may be performed after the automated analysis process, to look for additional vaccination artifact system calls that were not or could not be found by the automated method. The user may perform the manual analysis using tools, for example, a disassembler and/or debugger to located related vaccination artifact system calls. When a potential vaccination artifact system call is manually found, the malware may be re-executed and provided with a false indication in response to an interception of the manually found potential vaccination artifact system call. When the malicious code aborts infection of (i.e., does not infect) the emulated host computing device, the manually found potential vaccination artifact system call is determined to be a vaccination artifact system call and is added to the vaccination profile.

Exemplary methods of analysis are described with reference to FIG. 3.

At 106, a vaccination profile is generated according to the analysis of the malicious code. The vaccination profile includes the identified vaccination artifact system calls, optionally for multiple different malicious codes. It is noted that malicious codes may use the same vaccination artifact system calls, and/or different malicious codes may use their own unique vaccination artifact system calls. However, it is noted that the identity of the malicious code is not necessary for vaccination of client computing devices using the vaccination artifact system calls.

The vaccination profile may store individual vaccination artifact system calls, and/or may store a set of rules for matching patterns of vaccination artifact system calls. For example, the set of rules may define a sequence of execution of different vaccination artifact system calls, and/or the set of rules may define parallel execution of multiple vaccination artifact system calls.

The vaccination artifact system call(s) stored by the vaccination profile may include an indication of respective infection markers stored by the malicious code in a data storage medium for indicating an existing infection to the another instance of the malicious code attempting infection. For example, the vaccination artifact system call may be a query to the operating system to check a predefined filed stored on a hard drive, and the infection marker is an indication of the predefined file. The existing infection of the respective client computing devices is emulated by providing a false indication of the presence of the infection marker in the data storage medium in response to the vaccination artifact system call(s) issued by the another instance of the malicious code attempting infection. For example, in response to the another instance of the malicious code issuing a query to determine if the predefined file is stored on the hard drive, a false indication that the file is actually stored is provided. It is noted that the actual value of the infection marker may not necessarily be required, when the false indication may be provided in response to the query by the another instance of the malicious code without requiring knowing the actual value of the infection marker. In other cases, such as possible benign uses of the vaccination artifact system call(s), the value of the infection marker may be required for providing the false indication.

The vaccination profile may be stored in the vaccination profile repository.

The vaccination profile may be implemented as, for example, a database of vaccination artifact system calls, a text based (i.e., human readable) version of the vaccination artifact system calls, a compiled and/or binary (i.e., machine readable but not human readable) version of the vaccination artifact system calls, a script, a library file, a plug-in, and code instructions.

Optionally at 108, the vaccination profile is adjusted and/or updated. The vaccination profile may be adjusted via vaccination profile interface 206B implemented as a software interface, for example, an application programming interface (API), and/or software development kit (SDK), and/or other mechanism for transmission of instructions. The vaccination profile, stored by the computing device, may be adjusted based on instructions received over the network from another computing device, for example, client terminal(s) and/or server(s).

Exemplary instructions for adjusting and/or updating the vaccination profile include: a request to add a new vaccination artifact system call to the vaccination profile, a request to delete an existing vaccination artifact system call from the vaccination profile, and a request to retrieve a certain vaccination artifact system call stored in the vaccination profile.

It is noted that act 108 may be implemented independently of acts 102-106.

At 110, the vaccination profile is provided to multiple client computing devices (e.g., client terminals and/or servers) for vaccination thereof. The vaccination profile may be provided, for example, over the network (e.g., downloaded and/or transmitted) and/or via a portable storage device (e.g., CD ROM, disk on key) and/or via vaccination profile interface 206B. The vaccination profile may be provided for local storage and execution by the client computing device, and/or the vaccination profile may be remotely accessed over the network by the client computing devices. The vaccination profile may be provided in its entirety, and/or updates to the vaccination profile (e.g., newly identified vaccination artifact system calls) may be provided to client computing devices that already store local copies of the vaccination profile.

The vaccination profile is used by respective client computing devices, which are uninfected by the malicious code, to vaccinate themselves against infection by the malicious code.

The vaccination profile is used to emulate an existing infection of respective client computing devices by the malicious code, which prevents of infection of the respective client computing devices by another instance of the malicious code. The another instance of the malicious code aborts the process of infection of the respective client computing devices when receiving false data emulating infection marker(s) stored in a storage medium, in response to execution of vaccination artifact system call(s) stored by the vaccination profile (i.e., execution of one or a pattern of the vaccination artifact system calls).

Additional details of the use of the vaccination profile to emulate an existing infection of the client computing device for preventing infection thereof by malicious code is provide with reference to co-filed patent application having Ser. No. 16/041,795.

The vaccination profile protects the respective client computing device from infection by another version of the malicious code. The another version of the malicious code may be designed to evade signature based antimalware programs, but is detected based on the vaccination profile. A previous signature of the malicious code is different from an updated signature of the malicious code (e.g., an updated version of the malicious code). An anti-malware program trained to detect the malicious code according to the previous signature is unable to detect the another instance of the malicious code according to the first signature At 112, one or more acts 102, 104, 106, 108, and 110 are iterated. The iteration may be performed to analyze new malicious code for updating the vaccination profile for vaccination against the new malicious code (i.e., iterating acts 102, 104, 106, and 110). The iteration may be performed to adjust and/or update the vaccination profile via the software interface (e.g., vaccination profile interface 206B), by iterating acts 108 and 110. The iterations may be performed to automatically update the vaccination profile accordingly to new, previously unknown malicious codes found by a third party, via the vaccination profile interface 206B.

Figure 3:
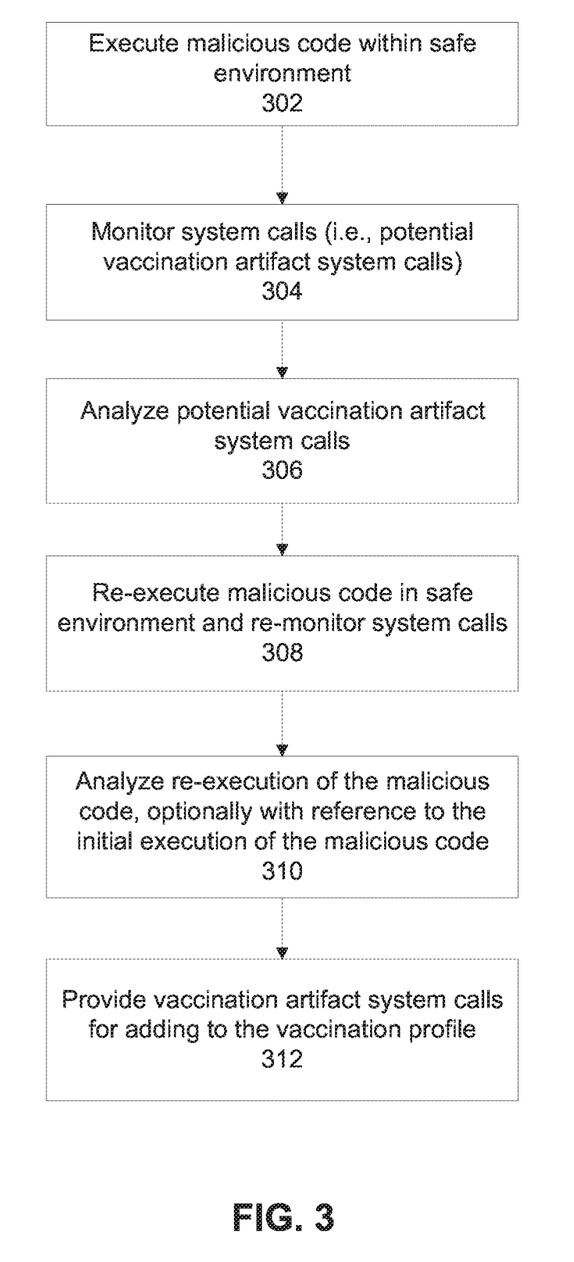
FIG. 3 is a flowchart of a process for analyzing the malicious code to identify the vaccination artifact system call(s) for inclusion in the vaccination profile, in accordance with some embodiments of the present invention.

Reference is now made to FIG. 3, which is a flowchart of a process for analyzing the malicious code to identify the vaccination artifact system call(s) for inclusion in the vaccination profile, in accordance with some embodiments of the present invention. The acts of the method described with reference to FIG. 3 may be implemented with reference to act 104 of FIG. 1. The acts of the method described with reference to FIG. 3 may be implemented by components of system 200 described with reference to FIG. 2.

At 302, the malicious code is placed within a safe analysis environment, for example, a sandbox. Execution of the malicious code is triggered, for example, to trigger the process of infection of a client computing device.

At 304, monitored system calls of the executing malicious code are logged. The monitored system calls denote potential vaccination artifact system calls that represent candidates for indicating to another instance of the malicious code attempting infection of the client computing device that the client computing device is already infected with the malicious code.

The system calls may be identified and logged by code that hooks and/or intercepts a predefined set of system calls that may be used by the malicious code, before the system calls reach the destination execution process (e.g., the operating system). Alternatively or additionally, system calls may be identified and logged by eavesdropping on the system calls (e.g., sniffing data structures storing the system calls that correspond to the vaccination artifact system calls), such that the system calls are still processed by the executing destination process (e.g., operating system). The reply message generated by the executing destination process (e.g., operating system) in response to the system call may be hooked and/or intercepted.

The log may include additional data, for example, a timestamp associated with each system call, the type of memory associated with the system call (e.g., volatile or permanent), and/or the value of the infection marker(s) that are indicative of the client computing device already infected by the malicious code.

Optionally, the log includes indications of instructions to access resources of the host computing device of the malicious code, which are compared to in instructions to access resources of the host computing device of the malicious code during a re-execution of the malicious code, as described with reference to act 310.

At 306, the potential vaccination artifact system calls are analyzed for selecting the vaccination artifact system call(s) for including within the vaccination profile. The analysis may be performed according to a set of rules.

Optionally, the analysis is based on comparing the initial execution of the malicious code to the re-execution of the malicious code. For clarity of explanation, the data collected during the initial execution of the malicious code that is compared to the re-execution of the malicious code is described with reference to act 310.

Alternatively or additionally, the analysis may include evaluating the potential vaccination artifact system calls for matches within a blacklist dataset storing a blacklist of records of system calls labeled as malicious. Matching potential vaccination artifact system calls are selected as vaccination artifact system calls for inclusion in the vaccination profile. The system calls labeled as malicious may be provided, for example, by a previous analysis of known malicious code, and/or manually entered by user (e.g., malware security expert). The blacklist of known malicious vaccination artifact system calls may be stored in the vaccination profile.

Alternatively or additionally, the analysis may include evaluating the potential vaccination artifact system calls for matches within a whitelist dataset storing a whitelist of records of system calls labeled as benign. Potential vaccination artifact system calls matching records in the whitelist may be removed from further processing (e.g., ignored), and/or not included as vaccination artifact system calls that are inserted into the vaccination profiles. Alternatively, the whitelist of known benign vaccination artifact system calls may be stored in the vaccination profile, for excluding system calls as being malicious. The system calls labeled as benign may be provided, for example, by a previous analysis of known benign code, by a previous analysis of known malicious code to determine system calls that are not used by malicious code, and/or manually entered by user (e.g., malware security expert).

A certain potential vaccination artifact system call may be labeled as unknown when the certain potential vaccination artifact is not matched to any records stored in the blacklist dataset and is not matched to any records stored in the whitelist dataset.

Alternatively or additionally, the potential vaccination artifact system calls (i.e., the monitored system calls) are analyzed to identify vaccination artifact system calls having an ability to vaccinate client computing devices. The ability to vaccinate may be determined according to a property of the respective vaccination artifact system call for emulating an existing infection of another instance of the malicious code, by providing the malicious code with false data in response to issuing the respective vaccination artifact system call. One or more of the potential vaccination artifact system calls are not identified as vaccination artifact system call(s) when the respective potential vaccination artifact system call excludes the property (i.e., the ability) for emulating the existing infection by another instance of the malicious code when the respective potential vaccination artifact system call is unable to provide the malicious code with false data in response to the certain system call. For example, potential vaccination artifact system calls that are not associated with feedback messages are excluded from being used as vaccination artifact system calls, since such potential vaccination artifact system calls without feedback are unable to indicate the presence of an existing infection to the malicious code, and/or the malicious code is unable to use such potential vaccination artifact system calls to determine whether the current client computing device is infected or not.

At 308, re-execution of the malicious code within the sandbox is triggered. The re-execution of the malicious code may be triggered, for example, by emulating a resetting of the computing device hosting the malicious code in the sandbox.

Monitored system call and optionally associated data of the re-executed malicious code are re-logged. Instructions to access resources of the host computing device issued by the malicious code may be re-logged, for comparison with instructions to access resources of the host computing device of the malicious code during the initial execution of the malicious code, as described with reference to act 310.

At 310, the re-execution of the malicious code is analyzed, optionally with reference to the initial execution of the malicious code, for selecting additional vaccination artifact system call(s) for inclusion within the vaccination profile.

One or more exemplary methods for analyzing the re-execution of the malicious code may be implemented:

Optionally, the potential vaccination artifact system calls identified during the initial execution of the malicious code are analyzed during the re-execution of the malicious code for validation of the potential vaccination artifact system calls as vaccination artifact system calls for inclusion in the vaccination profiles. The potential vaccination artifact system calls that are analyzed may include the potential vaccination artifact system calls that are labeled as unknown, and/or matching the blacklist, and/or may exclude potential vaccination artifact system calls matching the whitelist. Alternatively, potential vaccination artifact system calls matching the whitelist may be evaluated for validation that they are in fact benign. When an attempt by the malicious code to execute one or more of the potential vaccination artifact system calls is detected during the re-execution, the malicious code is provided with a false indication of execution of the potential vaccination artifact system call(s). The false indication of execution may be provided by hooking the potential vaccination artifact system call, and providing the malicious code with the false value of the infection marker based on the actual value of the infection marker provided during the initial execution. When the malicious code aborts the process of infection of the host client computing device (i.e., emulated by the sandbox), the potential vaccination artifact system call(s) may be validated as the vaccination artifact system call(s) for inclusion in the vaccination profile.

Alternatively or additionally, the initial execution of the malicious code is compared to the re-execution of the malicious code to identify changes in instructions to access resources of the host computing device issued by the malicious code. Exemplary changes in instructions to access resources of the host computing device include: execution time changes, installation errors, network activity, process creation, thread creation, file creation, and registry creation. Optionally, a score is computed according to the identified changes in instructions to access resources of the host computing device. The score is indicative of likelihood of the changes in instructions to access resources of the host computing device being indicative of malicious actions, or likelihood of the changes in instructions to access resources of the host computing device being indicative of benign actions. The score computed according to the changes in instructions to access resources of the host computing device acts as a surrogate marker for whether the potential vaccination artifact system call is malicious or benign. For example, during the initial execution, the malicious code issues the potential vaccination artifact system calls, to determine that the host client computing device is not yet infected. During the second execution, the malicious code infects the host client computing device, and performs malicious acts, for example, to steal data, tie up processing resources, and tie up network resources. Identifying the malicious behavior by the malicious code helps identify the potential vaccination artifact system calls issued by the malicious code as being malicious. The score may be, for example, a binary value, indicative of malicious or benign actions, or a probability value indicative of malicious or benign actions. The potential vaccination artifact system call is determined as being malicious or benign according to whether the action is determined to be malicious or benign. The potential vaccination artifact system call is stored as the vaccination artifact system call in the vaccination profile, optionally, in the blacklist or whitelist, according to the value of the score. The score may be computed, for example, based on known associations between certain actions (e.g., instructions to access resources of the host computing device) and malicious activity, for example, by a trained statistical classifier that receives the action (e.g., instructions to access resources of the host computing device) and outputs a probability of likelihood of the action being malicious.

Alternatively or additionally, the initial execution of the malicious code is compared to the re-execution of the malicious code to identify a lack of an attempt at re-storing an infection marker in a non-volatile storage medium during the re-execution of the malicious code when the infection marker is stored in the non-volatile storage medium during the initial execution of the malicious code. The malicious code stores the infection marker in a non-volatile storage medium during the initial execution. Since the storage medium is non-volatile, the malicious code assumes that the infection markers remains stored in the non-volatile storage medium, even after resets. Therefore, the malicious code does not attempt to resave the infection marker again during the re-execution, since the malicious code assumes that that infection marker is still saved in the non-volatile memory. The potential vaccination artifact system call(s) associated with the storage of the infection marker is identified as vaccination artifact system call(s) for inclusion in the vaccination profile.

At 312, the potential vaccination artifact system calls, which were identified as vaccination artifact system calls, are provided for adding to the vaccination profile.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant malicious codes and systems calls will be developed and the scope of the terms malicious code and system calls are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of generating a vaccination profile of malicious code for vaccination against other instances of the malicious code, comprising:
   providing a malicious code;
   analyzing the malicious code to identify at least one vaccination artifact system call indicative of an attempt to identify execution of an instance of the malicious code on a client computing device prior to another instance of the malicious code infecting the client computing device;
   generating according to the analysis of the malicious code, a vaccination profile including the at least one vaccination artifact system call; and
   providing the vaccination profile to a plurality of client computing devices for vaccination of the plurality of client computing devices uninfected by the malicious code, wherein an existing infection by the malicious code is emulated based on the vaccination profile for prevention of infection of the plurality of computing devices by the another instance of the malicious code.

2. The method according to claim 1, wherein the at least one vaccination artifact system call includes an indication of respective infection markers stored by the malicious code in a data storage medium for indicating an existing infection to the another instance of the malicious code attempting infection, wherein the infection markers are stored in the vaccination profile, wherein the existing infection of the plurality of client computing devices is emulated by providing a false indication of the presence of the infection marker in the data storage medium in response to the at least one vaccination artifact system call issued by the another instance of the malicious code attempting infection.

3. The method according to claim 1, wherein the analyzing the malicious code comprises:
   triggering an initial execution of the malicious code in a safe analysis environment that emulates a host computing device;
   logging monitored system calls of the executing malicious code, wherein the monitored system calls denote a plurality of potential vaccination artifact system calls representing candidates for indicating to another instance of the malicious code attempting infection of the client computing device that the client computing device is already infected with the malicious code; and
   analyzing the plurality of potential vaccination artifact system calls to select the at least one vaccination artifact system call according to a set of rules.

4. The method according to claim 3, wherein the analyzing the plurality of potential vaccination artifact system calls comprises:
   triggering re-execution of the malicious code within the safe analysis environment;
   detecting an attempt by the malicious code to execute at least one of the plurality of potential vaccination artifact system calls;
   intercepting the execution of at least one of the plurality of potential vaccination artifact system call;

providing the malicious code with a false indication of execution of the at least one of the plurality of potential vaccination artifact system calls according to an actual indication of execution of the at least one of the plurality of vaccination artifact system call provided to the malicious code during the initial execution of the malicious code; and selecting the at least one vaccination artifact system call when the malicious code aborts a process of infection in response to the provided false indication of the at least one of the plurality of potential vaccination artifact system calls.

5. The method according to claim 3, wherein the at least one vaccination artifact system call is selected according to a first dataset storing records of system calls labeled as malicious.

6. The method according to claim 5, wherein the first dataset is stored in the vaccination profile as a blacklist of known malicious vaccination artifact system calls.

7. The method according to claim 5, wherein a certain potential vaccination artifact system call of the plurality of potential vaccination artifact system calls is labeled as unknown when the certain potential vaccination artifact is not matched to a record stored in the first dataset and is not matched to a record stored in a second dataset storing records of systems calls labeled as benign.

8. The method according to claim 7, wherein the second dataset is stored in the vaccination profile as a whitelist of known benign vaccination artifact system calls.

9. The method according to claim 7, further comprising:
re-analyzing the malicious code by re-executing the malicious code;
re-logging monitored system calls of the re-executed malicious code;
comparing the initial execution of the malicious code to the re-execution of the malicious code to identify changes in instructions to access resources of the host computing device; and
storing the potential vaccination artifact system call labeled as unknown in the first dataset as a malignant record or in the second dataset as a benign record according to the identified changes in instructions to access resources of the host computing device.

10. The method according to claim 9, wherein the identified changes in instructions to access resources of the host computing device are selected from the group consisting of: execution time changes, installation errors, network activity, process creation, thread creation, file creation, and registry creation.

11. The method according to claim 9, further comprising:
computing according to the identified changes in instructions to access resources of the host computing device, a score indicative of at least one of: likelihood of the change in instructions to access resources of the host computing device being indicative of malicious actions, and or likelihood of the change in instructions to access resources of the host computing device being indicative of benign actions, wherein the potential vaccination artifact system call is stored in the first dataset or second dataset according to the value of the score.

12. The method according to claim 9, further comprising re-executing the malicious code by emulating a resetting of a computing device hosting the malicious code, and wherein the identified change in instructions to access resources of the host computing device include re-storing an infection marker in a volatile storage medium.

13. The method according to claim 9, wherein the identified change in instructions to access resources of the host computing device include detecting during the re-execution a lack of an attempt at re-storing an infection marker in a non-volatile storage medium, where the infection marker is stored in the non-volatile storage medium during the initial execution of the malicious code.

14. The method according to claim 1, wherein the another instance of the malicious code comprises another version of the malicious code.

15. The method according to claim 1, wherein the vaccination profile stores a set of rules for matching patterns of vaccination artifact system calls.

16. The method according to claim 1, further comprising receiving from a second computing device, via an application programming interface (API), instructions selected from the group consisting of: a request to add a new vaccination artifact system call to the vaccination profile, a request to delete an existing vaccination artifact system call from the vaccination profile, and a request to retrieve a certain vaccination artifact system call stored in the vaccination profile.

17. The method according to claim 1, wherein the analysis comprises:
triggering execution of the malicious code within a sandbox;
logging monitored system calls of the executing malicious code;
analyzing the monitored system calls to identify at least one vaccination artifact system call according to a property of a certain monitored system call for emulating an existing infection of another instance of the malicious code by providing the malicious code with false data in response to the certain system call.

18. The method according to claim 17, wherein another monitored system call is not identified as a vaccination artifact system call when the another monitored system call excludes the property for emulating the existing infection of another instance of the malicious code when the another monitored system call is unable to provide the malicious code with false data in response to the certain system call.

19. The method according to claim 1, wherein a first signature of the malicious code is different from a second signature of the another instance of the malicious code, such that an anti-malware program trained to detect the malicious code according to the first signature is unable to detect the another instance of the malicious code according to the first signature.

20. The method according to claim 1, wherein the another instance of the malicious code aborts a process of infection of one of the plurality of computing devices when receiving false data emulating at least one infection marker stored in a storage medium, in response to attempted execution of the at least one of the at least one vaccination artifacts system call executed by the malicious code.

21. The method according to claim 1, wherein the at least one vaccination artifact system call comprises operating system queries for detecting at least one infection marker stored in a storage medium, wherein the at least one infection marker indicates to another instance of malicious code attempting infection that the client computing device is already infected by the malicious code.

22. The method according to claim 21, wherein the operating system queries for detecting infection markers are selected from the group consisting of: detecting a predefined mutex stored in memory, detecting a predefined file stored in a data storage device, detecting a predefined key stored in a system registry, and combinations of the aforementioned.

23. The method according to claim 1, wherein the at least one vaccination artifact system call comprises operating system instructions for storing at least one infection marker in a storage medium, wherein the at least one infection marker indicates to another instance of the malicious code attempting infection that the client computing device is already infected by the malicious code.

24. The method according to claim 23, wherein the operating system queries for storing infection markers are selected from the group comprising: storing a predefined mutex in memory, storing a predefined file in a data storage device, storing a predefined key in a system registry, and combinations of the aforementioned.

25. A system for generating a vaccination profile of malicious code for vaccination against other instances of the malicious code, comprising:
 a non-transitory memory having stored thereon a code for execution by at least one hardware processor, the code comprising:
  code for accessing malicious code;
  code for analyzing the malicious code to identify at least one vaccination artifact system call indicative of an attempt to identify an execution of an instance of the malicious code on a client computing device prior to another instance of the malicious code infecting the client computing device;
  code for generating according to the analysis of the malicious code, a vaccination profile including the at least one vaccination artifact system call; and
  code for providing the vaccination profile to a plurality of client computing devices for vaccination of the plurality of client computing devices uninfected by the malicious code, wherein an existing infection by the malicious code is emulated based on the vaccination profile for prevention of infection of the plurality of client computing devices by the another instance of the malicious code.

26. A computer program product for generating a vaccination profile of malicious code for vaccination against other instances of the malicious code, comprising:
 a non-transitory memory having stored thereon a code for execution by at least one hardware processor, the code comprising:
  instructions for accessing malicious code;
  instructions for analyzing the malicious code to identify at least one vaccination artifact system call indicative of an attempt to identify an execution of an instance of the code on a client computing device prior to another instance of the malicious code infecting the client computing device;
  instructions for generating according to the analysis of the malicious code, a vaccination profile including the at least one vaccination artifact system call; and
  instructions for providing the vaccination profile to a plurality of client computing devices for vaccination of the plurality of client computing devices uninfected by the malicious code, wherein an existing infection by the malicious code is emulated based on the vaccination profile for prevention of infection of the plurality of client computing devices by the another instance of the malicious code.

\* \* \* \* \*